Feb. 21, 1956　　　　　G. H. AKLIN　　　　　2,735,340
PHOTOGRAPHIC OBJECTIVES FORMED OF TWO SIMPLE POSITIVE COMPONENTS AND
　　TWO NEGATIVE MENISCUS COMPONENTS AXIALLY ALIGNED THEREBETWEEN
Filed June 25, 1954　　　　　　　　　　　　　　　　2 Sheets-Sheet 1

*Fig. 1*

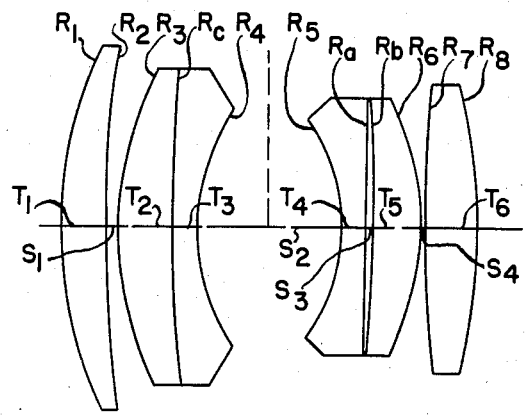

*Fig. 2*

| EF=100mm | | | | f/ 2.0 |
|---|---|---|---|---|
| LENS | N | V | RADII | THICKNESSES |
| 1 | 1.8804 | 41.1 | $R_1 = +71.07$mm<br>$R_2 = +153.3$ | $T_1 = 7.02$ mm<br>$S_1 = 0.61$ |
| 2 | 1.7767 | 44.7 | $R_3 = +54.72$ | $T_2 = 8.92$ |
| 3 | 1.6890 | 30.9 | $R_c = +457.1$<br>$R_4 = +36.74$ | $T_3 = 4.08$<br>$S_2 = 22.96$ |
| 4 | 1.6490 | 33.8 | $R_5 = -31.65$<br>$R_a = \infty$ | $T_4 = 3.87$<br>$S_3 = 0.54$ |
| 5 | 1.6968 | 56.2 | $R_b = -372.4$<br>$R_6 = -41.50$ | $T_5 = 8.38$<br>$S_4 = 0.50$ |
| 6 | 1.7445 | 45.6 | $R_7 = +704.2$<br>$R_8 = -83.79$ | $T_6 = 8.01$ |

GEORGE H. AKLIN
*INVENTOR.*
BY
*ATTORNEY & AGENT*

Feb. 21. 1956                G. H. AKLIN                2,735,340
     PHOTOGRAPHIC OBJECTIVES FORMED OF TWO SIMPLE POSITIVE COMPONENTS AND
        TWO NEGATIVE MENISCUS COMPONENTS AXIALLY ALIGNED THEREBETWEEN
Filed June 25, 1954                                     2 Sheets-Sheet 2

Fig. 3

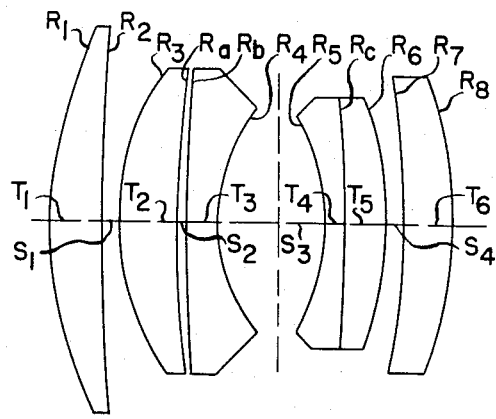

Fig. 4

| EF = 100mm | | | | f/ 2.0 |
|---|---|---|---|---|
| LENS | N | V | RADII | THICKNESSES |
| 1 | 1.6968 | 56.2 | $R_1$ = +61.48mm<br>$R_2$ = +915.6 | $T_1$ = 7.99 mm<br>$S_1$ = 2.08 |
| 2 | 1.6968 | 56.2 | $R_3$ = +40.25<br>$R_a$ = +225.8 | $T_2$ = 9.36<br>$S_2$ = 1.45 |
| 3 | 1.6725 | 32.2 | $R_b$ = +790.1<br>$R_4$ = +27.07 | $T_3$ = 4.10<br>$S_3$ = 16.51 |
| 4 | 1.6170 | 38.5 | $R_5$ = − 33.94 | $T_4$ = 2.70 |
| 5 | 1.7450 | 46.4 | $R_c$ = −393.2<br>$R_6$ = −48.29 | $T_5$ = 6.68<br>$S_4$ = 2.14 |
| 6 | 1.8037 | 41.8 | $R_7$ = −134.51<br>$R_8$ = −62.92 | $T_6$ = 7.13 |

GEORGE H. AKLIN
   INVENTOR.

BY

ATTORNEY & AGENT

United States Patent Office 2,735,340
Patented Feb. 21, 1956

---

2,735,340

PHOTOGRAPHIC OBJECTIVES FORMED OF TWO SIMPLE POSITIVE COMPONENTS AND TWO NEGATIVE MENISCUS COMPONENTS AXIALLY ALIGNED THEREBETWEEN

George H. Aklin, Rochester, N. Y., assignor to Eastman Kodak Company, Rochester, N. Y., a corporation of New Jersey Application June 25, 1954, Serial No. 439,420

5 Claims. (Cl. 88—57)

This invention relates to photographic objectives of the type comprising two simple positive lens components and two negative meniscus doublets axially aligned therebetween.

Objectives of this type, also known as the Gauss type, have been used as objectives for photographic and similar purposes for over half a century. Although they are very versatile, they are especially known for their superior correction of zonal spherical aberration when properly designed and are widely used at apertures of about F/2.0 to give superior definition over a field of about ±25°.

In the perpetual quest for larger apertures, wider field coverage or optionally for more highly corrected aberrations at the same aperture and field, many proposals have been made, most of which involve the expense of an additional lens element. I have discovered, however, that as much improvement can be gained by introducing a small airgap of slight negative power into one of the negative meniscus components as has been gained by some of the more expensive proposals.

According to one form of the present invention, a photographic objective is made up comprising two simple positive lens components and two negative meniscus doublets axially aligned therebetween, one doublet being cemented and the other having a small airgap whose maximum thickness is at the axis and is less than 0.02 F, where F is the equivalent focal length of the objective. All the interior surfaces of the doublets, that is the cemented surface in one doublet and the two slightly airspaced surfaces in the other doublet, have radii of curvature in the range from −1.3 F through infinity to +1.3 F and their average curvature is between +0.1/F and +0.5 F, where, for the purpose of averaging, these curvatures are taken as positive when the surface is concave toward the center of the objective and negative when convex thereto and the cemented surface is counted as two surfaces.

In this form of the invention the exterior surfaces, that is the front and rear surfaces of each component, have radii of curvature R, numbered by subscripts from the front to the rear of the objective, in the ranges set forth as follows:

$$0.50\ F < +R_1 < 0.90\ F$$
$$F < +R_2 < 20\ F$$
$$0.38\ F < +R_3 < 0.58\ F$$
$$0.27\ F < +R_4 < 0.37\ F$$
$$0.27\ F < -R_5 < 0.37\ F$$
$$0.37\ F < -R_6 < 0.54\ F$$
$$-0.80 < (F/R_7) < +0.20$$
$$0.60\ F < -R_8 < 1.20\ F$$

where the + and − values of the radii denote surfaces respectively convex and concave to the front in accordance with the usual convention. The radius $R_7$ of the front surface of the rear component is in the range from −1.25 F through infinity to +5 F and so is more conveniently expressed as the reciprocal of the radius, i. e. the curvature, in which case the range extends through zero. The other surfaces are expressed as radii in accordance with the more usual practice.

Also, in this form of the invention, the refractive indices N, also numbered by subscripts from front to rear, are preferably within the following ranges:

$$1.66 < N_1 < 1.92$$
$$1.66 < N_2 < 1.82$$
$$1.55 < N_3 < 1.72$$
$$1.58 < N_4 < 1.72$$
$$1.66 < N_5 < 1.82$$
$$1.68 < N_6 < 1.90$$

According to another way of describing the invention, a photographic objective is made up comprising two simple positive lens components and two negative meniscus doublets axially aligned therebetween, one doublet being cemented and other having a small airgap of slight negative power, in which the curvature $1/R_a$ of the front surface of the airgap algebraicly exceeds the curvature $1/R_b$ of the rear surface of the airgap by between $0.05/F$ and $0.5/F$, and the curvatures of all the interior surfaces of the doublets are in the range from $1/F$ in the sense of concavity toward the center of the objective through zero to $0.2/F$ in the opposite sense.

The exterior surfaces are specified with more optical significance by defining the curvature of the front surface of each component and the difference between the curvatures of the front and rear surfaces rather than defining the two curvatures separately. Likewise, there are advantages in specifying the refractive index of the rear element of each doublet relatively to the index of the front element thereof. Accordingly, according to this way of describing the invention:

$$1.0 < +\frac{F}{R_1} < 2.0$$
$$0.6 < \left(\frac{F}{R_1} - \frac{F}{R_2}\right) < 1.6$$
$$1.7 < +\frac{F}{R_3} < 2.6$$
$$0.8 < \left(\frac{F}{R_4} - \frac{F}{R_3}\right) < 1.4$$
$$2.8 < -\frac{F}{R_5} < 3.6$$
$$0.6 < \left(\frac{F}{R_6} - \frac{F}{R_5}\right) < 1.2$$
$$-0.8 < \frac{F}{R_7} < +0.2$$
$$0.8 < \left(\frac{F}{R_7} - \frac{F}{R_8}\right) < 1.7$$
$$1.66 < N_1 < 1.92$$
$$1.66 < N_2 < 1.82$$
$$0.01 < (N_2 - N_3) < 0.14$$
$$1.58 < N_4 < 1.72$$
$$0.02 < (N_5 - N_4) < 0.15$$
$$1.68 < N_6 < 1.90$$

where as before the + and − values of curvatures indicate surfaces respectively convex and concave to the front.

Preferably the airgap is located in the rear doublet, and the front doublet is cemented.

Preferably also the two simple positive components are so shaped that the sum $$\left(\frac{F}{R_1}-\frac{F}{R_2}+\frac{F}{R_7}-\frac{F}{R_8}\right)$$

is between 1.8 and 2.5.

In the accompanying drawing:

Fig. 1 shows an objective according to a preferred form of the invention.

Fig. 2 gives constructional data for one example according to Fig. 1.

Fig. 3 shows an objective according to another form of the invention.

Fig. 4 gives constructional data for an example according to Fig. 3.

The tables of Figs. 2 and 4 are repeated below, the data being given for a focal length of 100 mm.

*Example 1, Figs. 1 and 2*

| Lens | N | V | Radii, mm. | Thicknesses, mm. |
|---|---|---|---|---|
| 1 | 1.8804 | 41.1 | $R_1$=+ 71.07 | $T_1$= 7.01 |
|   |        |      | $R_2$=+153.3  | $S_1$= 0.61 |
| 2 | 1.7767 | 44.7 | $R_3$=+ 54.72 | $T_2$= 8.92 |
|   |        |      | $R_c$=+457.1  |  |
| 3 | 1.6890 | 30.9 | $R_4$=+ 36.74 | $T_3$= 4.08 |
|   |        |      |               | $S_2$=22.96 |
|   |        |      | $R_5$=− 31.65 |  |
| 4 | 1.6490 | 33.8 |               | $T_4$= 3.87 |
|   |        |      | $R_a$=− ∞    | $S_3$= 0.54 |
|   |        |      | $R_b$=−372.4 |  |
| 5 | 1.6968 | 56.2 |               | $T_5$= 8.38 |
|   |        |      | $R_6$=− 41.50 |  |
|   |        |      |               | $S_4$= 0.50 |
| 6 | 1.7445 | 45.6 | $R_7$=+704.2  | $T_6$= 8.01 |
|   |        |      | $R_8$=− 83.79 |  |

*Example 2, Figs. 3 and 4*

| Lens | N | V | Radii, mm. | Thicknesses, mm. |
|---|---|---|---|---|
| 1 | 1.6968 | 56.2 | $R_1$=+ 61.48 | $T_1$= 7.99 |
|   |        |      | $R_2$=+915.6  | $S_1$= 2.08 |
| 2 | 1.6968 | 56.2 | $R_3$=+ 40.25 | $T_2$= 9.36 |
|   |        |      | $R_a$=+225.8  |  |
|   |        |      |               | $S_2$= 1.45 |
| 3 | 1.6725 | 32.2 | $R_b$=+790.1  | $T_3$= 4.10 |
|   |        |      | $R_4$=+ 27.07 |  |
|   |        |      |               | $S_3$=16.51 |
|   |        |      | $R_5$=− 33.94 |  |
| 4 | 1.6170 | 38.5 |               | $T_4$= 2.70 |
|   |        |      | $R_c$=−393.2  |  |
| 5 | 1.7450 | 46.4 |               | $T_5$= 6.68 |
|   |        |      | $R_6$=− 48.29 |  |
|   |        |      |               | $S_4$= 2.14 |
|   |        |      | $R_7$=−134.51 |  |
| 6 | 1.8037 | 41.8 |               | $T_6$= 7.13 |
|   |        |      | $R_8$=− 62.92 |  |

In these tables as in the drawings and in the tables below, the lens elements are numbered in order from front to rear in the first column, the refractive indices N for the D line of the spectrum and the conventional dispersive indices V are given in the next two columns, and the radii of curvature R of the lens surfaces, the thicknesses T of the lens elements and the airspaces S, all identified by subscripts, are given in the last two columns. The numbering of the R's is slightly unusual in that the exterior surfaces, that is the front and rear surfaces of the individual components, are numbered from 1 to 8 from front to rear while $R_a$ and $R_b$ denote the two interior surfaces of the slightly airspaced doublet respectively in order from front to rear and $R_c$ denotes the cemented surface of the other doublet. The thicknesses and spaces are each numbered from front to rear in the usual way. The + and − values of the radii indicate surfaces respectively convex and concave to the front.

Example 1 is the preferred design now contemplated for use in a miniature camera and covers a field of ±25.4°. The primary and secondary curvatures have been computed at 18° and 24° and are between −0.007 and zero at both angles.

Example 2 was designed for projecting the face of a television tube at a magnification of 1.8 to 1, and has the small air gap in the front doublet. This air gap is larger than in the other examples but still less than 0.02 F. The elements of this doublet are intended to be spaced apart at the edge by a thin spacing washer or shim.

To further illustrate the invention several additional examples are given below, all of which were likewise designed to work at a relative aperture of F/2.0 and to cover fields of about ±20° to 25°, and all of which have the airspace in the rear doublet in accordance with a preferred feature of the invention. The focal length is 100 mm. in each case.

*Example 3*

| Lens | N | V | Radii, mm. | Thicknesses, mm. |
|---|---|---|---|---|
| 1 | 1.734 | 51.2 | $R_1$=+ 56.40 | $T_1$= 7.0 |
|   |       |      | $R_2$=+ 120.0 | $S_1$= 1.1 |
| 2 | 1.734 | 51.2 | $R_3$=+ 44.88 | $T_2$= 9.0 |
| 3 | 1.617 | 36.6 | $R_c$=+ 301.3 | $T_3$= 2.7 |
|   |       |      | $R_4$=+ 28.63 |  |
|   |       |      |               | $S_2$=24.6 |
|   |       |      | $R_5$=− 29.63 |  |
| 4 | 1.6124 | 35.1 |               | $T_4$= 4.1 |
|   |        |      | $R_a$=− 442.8 | $S_3$= 0.6 |
|   |        |      | $R_b$=− 206.0 |  |
| 5 | 1.6968 | 56.2 |               | $T_5$= 7.4 |
|   |        |      | $R_6$=− 42.46 |  |
|   |        |      |               | $S_4$= 1.0 |
|   |        |      | $R_7$=−4051   |  |
| 6 | 1.7272 | 52.1 |               | $T_6$= 8.0 |
|   |        |      | $R_8$=− 66.19 |  |

*Example 4*

| Lens | N | V | Radii, mm. | Thicknesses, mm. |
|---|---|---|---|---|
| 1 | 1.7551 | 47.2 | $R_1$=+ 67.06 | $T_1$= 7.0 |
|   |        |      | $R_2$=+ 158.4 | $S_1$= 0.6 |
| 2 | 1.7272 | 52.2 | $R_3$=+ 50.40 | $T_2$= 8.9 |
| 3 | 1.6210 | 36.2 | $R_c$=+ 301.0 | $T_3$= 3.6 |
|   |        |      | $R_4$=+ 33.49 |  |
|   |        |      |               | $S_2$=23.9 |
|   |        |      | $R_5$=− 31.10 |  |
| 4 | 1.6153 | 31.9 |               | $T_4$= 3.9 |
|   |        |      | $R_a$=− 371.7 | $S_3$= 0.9 |
|   |        |      | $R_b$=− 139.6 |  |
| 5 | 1.7272 | 52.2 |               | $T_5$= 7.4 |
|   |        |      | $R_6$=− 42.76 |  |
|   |        |      |               | $S_4$= 0.8 |
|   |        |      | $R_7$=+1129.  |  |
| 6 | 1.7272 | 52.2 |               | $T_6$= 8.0 |
|   |        |      | $R_8$=− 71.90 |  |

Examples 3 and 4, like Example 1, were designed for use on miniature cameras. Example 4, is similar to Example 3 but was designed for a different camera requiring a slightly longer back focal length (73 mm. as compared with 71 mm.). Example 1, which was designed later, has a back focal length of 73.5 mm.

Examples 5 and 6 below, were designed to work in ultra-violet and blue-violet light, respectively, and at finite conjugates giving a 2-to-1 reduction.

Example 5

| Lens | N | V | Radii, mm. | Thicknesses, mm. |
|---|---|---|---|---|
| 1 | 1.734 | 51.2 | $R_1=+\ 74.34$ | $T_1=\ 7.1$ |
|   |       |      | $R_2=+\ 233.8$ | $S_1=\ 1.1$ |
| 2 | 1.6968 | 56.2 | $R_3=+\ 45.66$ | $T_2=\ 8.0$ |
|   |        |      | $R_c=+\ 599.9$ | |
| 3 | 1.575 | 41.4 |                | $T_3=\ 6.8$ |
|   |       |      | $R_4=+\ 30.48$ | $S_2=17.5$ |
|   |       |      | $R_5=-\ 29.86$ | |
| 4 | 1.6725 | 32.2 |                | $T_4=\ 2.8$ |
|   |        |      | $R_a=-\ 705.2$ | $S_3=\ 0.2$ |
|   |        |      | $R_b=-\ 414.4$ | |
| 5 | 1.7445 | 45.8 |                | $T_5=11.0$ |
|   |        |      | $R_6=-\ 41.01$ | $S_4=\ 0.5$ |
|   |        |      | $R_7=-1207.$   | |
| 6 | 1.7340 | 51.2 |                | $T_6=\ 8.0$ |
|   |        |      | $R_8=-\ 88.31$ | |

Example 6

| Lens | N | V | Radii, mm. | Thicknesses, mm. |
|---|---|---|---|---|
| 1 | 1.734 | 51.2 | $R_1=+\ 74.40$ | $T_1=\ 7.10$ |
|   |       |      | $R_2=+\ 254.8$ | $S_1=\ 1.10$ |
| 2 | 1.6968 | 56.2 | $R_3=+\ 45.77$ | $T_2=\ 8.01$ |
|   |        |      | $R_c=+\ 347.4$ | |
| 3 | 1.605 | 37.9 |                | $T_3=\ 7.41$ |
|   |       |      | $R_4=+\ 30.77$ | $S_2=17.01$ |
|   |       |      | $R_5=-\ 29.66$ | |
| 4 | 1.6725 | 32.2 |                | $T_4=\ 2.80$ |
|   |        |      | $R_a=-\ 773.2$ | $S_3=\ 0.16$ |
|   |        |      | $R_b=-\ 473.7$ | |
| 5 | 1.7551 | 47.2 |                | $T_5=11.00$ |
|   |        |      | $R_6=-\ 40.97$ | $S_4=\ 0.50$ |
|   |        |      | $R_7=-1240.$   | |
| 6 | 1.7551 | 47.2 |                | $T_6=\ 6.00$ |
|   |        |      | $R_8=-\ 90.25$ | |

Example 7 was designed for use in the ordinary photographic range of wavelengths at a 6-to-1 magnification ratio.

Example 7

| Lens | N | V | Radii, mm. | Thicknesses, mm. |
|---|---|---|---|---|
| 1 | 1.7340 | 51.2 | $R_1=+\ 77.46$ | $T_1=\ 7.1$ |
|   |        |      | $R_2=+\ 265.3$ | $S_1=\ 1.1$ |
| 2 | 1.6968 | 56.2 | $R_3=+\ 48.49$ | $T_2=\ 8.0$ |
|   |        |      | $R_c=+\ 197.4$ | |
| 3 | 1.6170 | 38.5 |                | $T_3=\ 6.8$ |
|   |        |      | $R_4=+\ 33.31$ | $S_2=16.5$ |
|   |        |      | $R_5=-\ 31.63$ | |
| 4 | 1.6890 | 30.9 |                | $T_4=\ 2.8$ |
|   |        |      | $R_a=-1368.$   | $S_3=\ 0.4$ |
|   |        |      | $R_b=-\ 377.1$ | |
| 5 | 1.7551 | 47.2 |                | $T_5=11.0$ |
|   |        |      | $R_6=-\ 40.80$ | $S_4=\ 0.6$ |
|   |        |      | $R_7=+\ 584.3$ | |
| 6 | 1.7340 | 51.2 |                | $T_6=\ 8.0$ |
|   |        |      | $R_8=-\ 108.4$ | |

It is directly evident from these tables of data that all the radii of curvature and refractive indices are within the ranges specified according to the first way of describing the invention. The reciprocal $F/R_7$ ranges from $-0.74$ in Example 2 to $+0.17$ in Example 7, which is within the range specified. The interior surfaces have radii $R_a$, $R_b$ and $R_c$ which are all within the range from $-1.3\ F$ through infinity to $+1.3\ F$ and the specified average curvature $$\left(\frac{2F}{R_c}+\frac{F}{R_a}+\frac{F}{R_b}\right)$$

ranges from $+0.18$ in Example 1 to $+0.42$ in Example 4, also within the specified range. It is to be noted that for the purposes of obtaining this average these radii are considered as positive when the surface is concave toward the center of the objective and negative when it is convex thereto. In all the examples, these surfaces are either concave toward the center of the objective or plane, but one of them can be made slightly convex thereto without departing from the scope of the invention.

By taking reciprocals of the radii it is easily seen that all the examples also embody all the broad features according to the second way of describing the invention. The ranges specified for the reciprocals of $R_1$, $R_3$, $R_5$ and $R_7$ correspond roughly to the ranges specified directly in terms of radii. The difference in curvature specified for each component is a quantity which when multiplied by $(N-1)$ gives the power exactly in the case of a thin lens element and approximately in the case of a thicker lens. These differences range from 0.76 in 1 to 1.52 in Ex. 2 for the front component, from 0.90 in Ex. 1 to 1.26 in Ex. 3 for the second, from 0.71 in Ex. 7 to 1.01 in Ex. 3 for the third, and from 0.85 in Ex. 2 to 1.49 in Ex. 3 for the fourth component.

Example 2 has a considerably stronger front component and a considerably weaker rear component than the other examples, so that the total power of the two positive components is about the same, as indicated by the fact that the sum of the first and fourth of the above differences, that is $$\left(\frac{F}{R_1}-\frac{F}{R_2}+\frac{F}{R_7}-\frac{F}{R_8}\right)$$

ranges from 1.9 in Ex. 7 to 2.4 in Ex. 1 in accordance with this preferred feature of the invention.

The two slightly airspaced surfaces $R_a$ and $R_b$ differ in curvature by from 0.08 in Ex. 5 to 0.45 in Ex. 4, in accordance with a broad feature of the invention. In most of the examples these two surfaces may be mounted in edge contact.

For the purpose of color correction, the average dispersive index of the positive elements is between 1.3 and 1.6 times that of the negative elements in every example. Example 5, corrected in the ultraviolet, lies in the lower part of this range, and the other examples lie in the middle and upper parts.

For ease in manufacture, the thickness of each positive element is between $0.05\ F$ and $0.15\ F$ and that of the negative elements is between $0.02\ F$ and $0.10\ F$. In every example the overall length between the vertices of surfaces $R_1$ and $R_8$ is between $0.55\ F$ and $0.70\ F$.

Lenses according to the invention have been found to give very excellent definition at the indicated aperture and field and are particularly notable for their highly corrected zonal curvature and astigmatism.

I claim:

1. An objective for photographic purposes comprising two simple positive lens components and two negative meniscus doublets axially aligned therebetween, one doublet being cemented and the other having a small air gap whose maximum thickness is at the axis and is less than $0.02\ F$, where F is the equivalent focal length of the objective, in which the radii of curvature R of the lens surfaces and the refractive indices N of the lens elements for the D spectral line are within the following limits:

$$-0.58 < (F/R_a) < +0.78$$
$$-0.58 < (F/R_b) < +0.78$$
$$-0.58 < (F/R_c) < +0.78$$
$$0.50\,F < +R_1 < 0.90\,F$$
$$F < +R_2 < 20\,F$$
$$0.38\,F < +R_3 < 0.58\,F$$
$$0.27\,F < +R_4 < 0.37\,F$$
$$0.27\,F < +R_5 < 0.37\,F$$
$$0.37\,F < +R_6 < 0.54\,F$$
$$-0.20 < (F/R_7) < +0.80$$
$$0.60\,F < +R_8 < 1.20\,F$$
$$1.66 < N_1 < 1.92$$
$$1.66 < N_2 < 1.82$$
$$1.55 < N_3 < 1.72$$
$$1.58 < N_4 < 1.72$$
$$1.66 < N_5 < 1.82$$
$$1.68 < N_6 < 1.90$$

and moreover $$+0.4 < \left(\frac{F}{R_a} + \frac{F}{R_b} + \frac{2F}{R_c}\right) < +2.0$$

where the + and − values of the radii denote surfaces respectively concave and convex to the center of the objective, where $R_a$ and $R_b$ refer to the surfaces bounding the airgap, $R_c$ refers to the cemented surface and $R_1$ to $R_8$ inclusive refer to the exterior surfaces of the respective components in order from front to rear, and where $N_1$ to $N_6$ refer to the respective lens elements in order from front to rear.

2. An objective according to claim 1 in which the front doublet is cemented and the rear doublet is airspaced.

3. An objective for photographic purposes comprising two simple positive lens components and two negative meniscus doublets axially aligned therebetween, one doublet being cemented and the other having a small air gap of negative power whose maximum thickness is at the axis and is less than 0.02 F, where F is the equivalent focal length of the objective, in which the radii of curvature R of the lens surfaces and the refractive indices N of the lens elements for the D spectral line are within the following limits:

$$-0.2 < \frac{F}{R_a} < +1.0$$
$$-0.2 < \frac{F}{R_b} < +1.0$$
$$-0.2 < \frac{F}{R_c} < +1.0$$
$$+1.0 < \frac{F}{R_1} < +2.0$$
$$+0.6 < \left(\frac{F}{R_1} - \frac{F}{R_2}\right) < +1.6$$
$$+1.7 < \frac{+F}{R_3} < +2.6$$
$$+0.8 < \left(\frac{F}{R_4} - \frac{F}{R_3}\right) < 1.4$$
$$+2.8 < \frac{F}{R_5} < +3.6$$
$$+0.6 < \left(\frac{F}{R_5} - \frac{F}{R_6}\right) < +1.2$$
$$-0.2 < \frac{F}{R_7} < +0.8$$
$$+0.8 < \left(\frac{F}{R_8} - \frac{F}{R_7}\right) < +1.7$$
$$1.66 < N_1 < 1.92$$
$$1.66 < N_2 < 1.82$$
$$0.01 < (N_2 - N_3) < 0.14$$
$$1.58 < N_4 < 1.72$$
$$0.02 < (N_5 - N_4) < 0.15$$
$$1.68 < N_6 < 1.96$$

where the + and − values of the radii denote surfaces respectively concave and convex to the center of the objective, where $R_a$ and $R_b$ refer to the surfaces bounding the airgap, $R_c$ refers to the cemented surface and $R_1$ to $R_8$ inclusive refer to the exterior surfaces of the respective components in order from front to rear, and where $N_1$ to $N_6$ refer to the respective lens elements in order from front to rear, and in which, moreover, the two surfaces bounding the airgap differ in curvature by between 0.05/F and and 0.50/F in the sense above indicated.

4. An objective according to claim 3 in which the front doublet is cemented and the rear doublet is airspaced.

5. An objective according to claim 3 which is further characterized in that $$+1.8 < \left(\frac{F}{R_1} - \frac{F}{R_2} - \frac{F}{R_7} + \frac{F}{R_8}\right) < +2.5$$

References Cited in the file of this patent

UNITED STATES PATENTS

| | | |
|---|---|---|
| 1,955,591 | Lee | Apr. 17, 1934 |
| 2,627,205 | Tronnier | Feb. 3, 1953 |

FOREIGN PATENTS

| | | |
|---|---|---|
| 439,556 | Germany | Jan. 13, 1927 |
| 427,008 | Great Britain | Apr. 12, 1935 |
| 665,520 | Germany | Sept. 27, 1938 |
| 683,659 | Great Britain | Dec. 3, 1952 |